US006938887B2

(12) United States Patent
Achenbach

(10) Patent No.: US 6,938,887 B2
(45) Date of Patent: Sep. 6, 2005

(54) SUSPENSION SYSTEM FOR BICYCLES

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 10/144,448

(22) Filed: May 10, 2002

(65) Prior Publication Data

US 2002/0175035 A1 Nov. 28, 2002

(30) Foreign Application Priority Data

May 10, 2001 (DE) .......................................... 101 22 729

(51) Int. Cl.⁷ .............................................. F16F 9/342
(52) U.S. Cl. ............................... 267/64.22; 267/64.18; 188/315; 188/322.13
(58) Field of Search ................................ 188/314, 315, 188/269, 281, 282.2, 282.5, 282.6, 282.9, 283, 284, 286, 287, 288, 289, 316, 317, 319.1, 322.13, 322.15, 322.21, 322.22; 267/64.11, 64.15, 64.18, 64.22, 64.25, 64.26, 64.28; 280/124.158, 124.159; 137/511, 625.39, 625.42, 625.48; 251/205, 210, 321, 324, 336

(56) References Cited

U.S. PATENT DOCUMENTS

| | | | | |
|---|---|---|---|---|
| 2,372,137 A | * | 3/1945 | Thornhill | 267/64.15 |
| 2,470,616 A | * | 5/1949 | Harmon | 267/64.22 |
| 2,563,518 A | * | 8/1951 | Dickerman | 267/64.22 |
| 2,564,790 A | * | 8/1951 | Orloff et al. | 267/64.15 |
| 2,756,071 A | | 7/1956 | Riva | |
| 3,552,766 A | * | 1/1971 | Willich | 280/124.127 |
| 3,595,349 A | | 7/1971 | Ortheil | 188/189 |
| 3,793,498 A | * | 2/1974 | Matsui et al. | 200/61.45 R |
| 3,941,403 A | * | 3/1976 | Hiruma | 280/6.157 |
| 4,405,119 A | * | 9/1983 | Masclet et al. | 267/64.22 |
| 4,438,909 A | * | 3/1984 | Matsumoto | 267/64.26 |
| 4,529,180 A | * | 7/1985 | Hill | 267/64.28 |
| 4,807,860 A | * | 2/1989 | Simons | 267/217 |
| 4,915,364 A | * | 4/1990 | Perlini | 267/64.26 |
| 4,973,854 A | * | 11/1990 | Hummel | 267/64.26 |
| 5,014,966 A | * | 5/1991 | Wang | 267/64.26 |
| 5,028,037 A | * | 7/1991 | Wang | 267/64.13 |
| 5,158,267 A | * | 10/1992 | Pascal | 267/64.12 |
| 5,775,677 A | * | 7/1998 | Englund | 267/64.11 |
| 5,862,895 A | * | 1/1999 | Ricard | 188/189 |
| 6,135,434 A | | 10/2000 | Marking | |
| 6,279,703 B1 | * | 8/2001 | Mete | 188/319.1 |
| 6,296,092 B1 | | 10/2001 | Marking et al. | |
| 6,360,857 B1 | | 3/2002 | Fox et al. | |
| 2002/0190445 A1 | * | 12/2002 | Achenbach | |

FOREIGN PATENT DOCUMENTS

| | | |
|---|---|---|
| DE | 919 150 C | 10/1954 |
| DE | 1 505 522 | 4/1970 |
| DE | 3438163 A1 * | 4/1986 |
| DE | 89 08 133 U1 | 10/1989 |
| DE | 94 00 166.9 U1 | 4/1994 |
| DE | 200 05 224 U1 | 8/2001 |
| DE | 100 11 767 C1 | 10/2001 |
| FR | 1073744 | 9/1954 |
| JP | 57110842 A * | 7/1982 |
| JP | 63125837 A * | 5/1988 |
| WO | WO 99/03 721 A1 | 1/1999 |
| WO | WO 99/03726 | 1/1999 |

* cited by examiner

Primary Examiner—Matthew C. Graham
Assistant Examiner—Melody M. Burch
(74) Attorney, Agent, or Firm—Greer, Burns & Crain, Ltd.

(57) ABSTRACT

The present invention relates to a spring damper system for bicycles having a first load-applying segment, a second load-applying segment, at least one spring mechanism, a damping means, and a regulating mechanism that automatically effects a damping behavior of the damping means based on a tension or load present in the at least one spring mechanism. A method of spring suspension and damping of bicycles is also provided.

16 Claims, 7 Drawing Sheets

SUSPENSION SYSTEM FOR BICYCLES

BACKGROUND OF THE INVENTION

The present invention relates to a spring damper system for bicycles as well as a method of spring suspension and damping of bicycles.

Apart from spring damper systems mounted on bicycle handlebars or bicycle seats, there are in particular known spring damper systems for bicycles which serve the wheel bearing.

Spring damper systems utilized for the suspension of bicycle wheels are known from configurations which are effective between a bicycle's front wheel and its frame as well as from configurations which are effective between a bicycle's rear wheel and its frame.

Spring damper systems which are effective between a bicycle's front wheel and its frame are known from configurations in which the spring damper system is arranged in a region of the fork tube as well as from configurations in which the spring damper system is arranged in the region of the bicycle fork.

As a rule, spring damper systems arranged in the region of the bicycle fork are integrated into one or both stem tubes, fork tubes respectively.

Spring damper systems for a bicycle's rear wheel suspension as such have become known in which, based on an oil-damping principle, a damping cartridge is externally surrounded radially by a steel spring. There are other isolated spring damper systems already known which employ gas springs. Also known are systems utilizing a gas spring acting as a positive spring as well as a gas spring acting as a negative spring.

SUMMARY OF THE INVENTION

It is the task of the present invention to provide a further spring damper system.

In accordance with a special aspect, the invention is based on the task of providing a spring damper system which can readily be adapted to different operational conditions.

In accordance with a special aspect, the invention is based on the task of providing a spring damper system for vehicles such as bicycles which is operationally reliable given different road surfaces and different cyclists and which exhibits comfortable spring damping properties and, in addition, does away with the need for excessive assembly or adjusting efforts to the greatest degree possible.

This task is solved by a spring damper system in accordance with claim 1.

Preferred configurations of the invention comprise the subject matter of the subclaims.

It must first be pointed out that the inventive spring damper system as well as the inventive procedure can in principle be utilized in a wide variety of applications, for instance in various vehicles and the like. For purposes of simplification, however, an example of the invention will be described within the context of this disclosure as a spring damper system and/or method used or for use in damping/suspension of a bicycle wheel and particularly with respect to a bicycle's rear wheel damping/suspension. The given indication of "for bicycles," however, is not to be construed as a limitation of the protective scope but rather merely refers to a preferred feasible application.

In accordance with the present invention, a spring damper system is provided to particularly comprise a spring mechanism and a damping means whereby the damping behavior of said damping means is adjusted automatically with a regulating mechanism. In accordance with the invention, this automatic adjusting is effected in relation to the tension which is given, particularly at that current moment, in a spring of the spring mechanism.

Said spring is preferably a gas spring or preferably comprises a gas spring.

The spring mechanism as well as the damping means are respectively arranged to be operatively effective between a first and a second load-applying segment of the spring damper system.

It is preferable to provide for the spring mechanism as well as the damping means to also be respectively arranged spatially between the first and the second load-applying segment of the spring damper system.

The term "damping behavior" with respect to the damping means of the present invention is to be understood in a broad sense. "Damping behavior" is especially to be understood as the damping rate of said damping means.

The "damping behavior" of the damping means may, however, also be, for example, the force which is actually exerted on the damping means, effectively damped respectively. Thus, as an example, it is also preferred that contingent upon the force/tension given in the spring mechanism, the regulating mechanism determines a force or force component to be introduced to the damping means.

It particularly preferential for the damping rate of said damping means to be set for a pre-defined section of the damping means' load versus displacement characteristic. It is also preferred that the damping rate be set for the entire load versus displacement characteristic of the damping means.

The adjusting or modifying of the damping rate preferably transpires in finite steps or in infinitely variable fashion or according to a pre-defined function or in some other way.

The damping behavior is preferably set such that modification of the damping means is effected at one or several respective displacement positions and/or load values of the load versus displacement characteristic and this notably being especially automatically, contingent upon the force being exerted on the damper.

In preferred configuration, the automatic adjusting is effected such that the damping rate is always constant with respect to pre-defined displacement and/or load intervals and changes upon transition into one or several adjacent intervals.

The transitional zones between such intervals may be of different configurations such that, for example, the damping rate increases substantially sharply between said intervals or such that the damping rate leads from one to the next in fluent or steady manner.

It is moreover preferred that the damping rate changes continuously with respect to the displacement/load across the load versus displacement characteristic.

It must be noted that in the sense of the present invention, the load-applying segments are, in particular, areas of the spring damper system which can be coupled with conversion elements such that the spring damper system is effectively operative between two or more of the conversion elements.

Such load-applying segments may be, for example, housing segments, which are arranged to be movable relative one another such as, for instance, the respective terminating ends of different cylindrical housing segments arranged to be displaceable relative to one another in the axial direction.

The load-applying segments may be, for example, configured in eyelet or grommet fashion; in particular, the load-applying segments are configured so as to accommodate mounting means such as, for example, a screw or a pin or the like. It is, however, noted that a load-applying segment may also be of different configurations and a plurality of other further configuration are likewise preferred.

The load-applying segments of an inventive spring damper system may all be configured the same or differ from one another.

The spring mechanism preferably comprises at least one spring configured as a gas spring, whereby the adjusting of the damping behavior/damping rate of the damping means is automatically effected in relation to the tension/load present in same.

In preferred configuration, the damping means comprises a system of chambers filled with a damper fluid such as, for instance, oil. This system of chambers may comprise a first and a second chamber between which a damper fluid is moved through damping openings for the purpose of damping. The damping openings connect the two chambers in at least one direction of load.

Means are preferably provided that can change the cross-sectional area rendered opened with respect to the damping openings.

It is particularly preferred to provide for valve means to clear the different directional load-development cross-sectional opened area of the damping openings. As an example, a type of valve means is provided on at least one of the damping openings which induces a damping effect in one direction of load on the damping opening and which seals same in the direction of back load so that no damping effect is then yielded at the damping opening.

The valve means can be configured, for instance, as a type of small spring plate mounted, particularly single-sidedly, and extending in front of the opening.

It is moreover preferred that the valve means to be configured as a type of annular small spring plate in which a fastening element sealably engages at a radially inward situated area, via which the small spring plate is secured relative to the damping opening. In this particular configuration, it is preferred to provide for the radially outer situated area of the small spring plate to be arranged so as to be movable relative to the damping opening and which bars the opening in a first position and releases a cross-sectional flow in a second position; it is particularly preferred in the second position that the flowing damper fluid releases the cited cross-sectional flow subject to a spring load of the small spring plate, respectively induces a second position of the small spring plate.

A check valve may in particular be provided at one or several damping openings.

A configuration of this type may also allow the inducing of, for example, a directional load-dependent adjustment in the damping behavior.

It is noted that the present invention especially provides for adjusting the damping behavior of the damping means based on a hydraulic principle and this being effected, in particular, automatically. In this given context, "hydraulic principle" is to be understood in particular as there being fluid moved between the different chambers for the purpose of damping, whereby the damping openings, channels respectively, through which the fluid moves between these chambers are configured so as to give rise to a damping effect.

In the sense of the present invention, damper fluid refers particularly to a liquid. For example, the damper fluid may be a runny, viscous, high viscosity or other type of liquid. Preferably, oil is employed as the damper fluid.

It is however noted that other damper fluids are also preferential such as, for example, gas.

In preferred configuration, the regulating mechanism comprises at least one control element which is arranged to be moveable relative at least one damping opening.

In the context of the present invention, a damping opening constitutes in particular an opening through which a damper fluid, particularly liquid, and especially oil, is moved for the purpose of damping. The relatively displaceable control element is particularly arranged so as to clear different opening cross-sectional areas of the damping openings when at different positions.

The control element can in particular be utilized to set the opened state or the opened cross-sectional area of one or more damping openings.

It is preferential, for example, that the control element can be set with respect to a pre-defined damping opening in such a manner so as to change the cross-sectional area of the damping opening.

It is further preferential for the control element to be set with respect to different non-contiguous damping openings and thereby seal or partly seal or, in reversed direction of load, open or partly or widely open differing damping openings successively.

It is particularly provided that the entire cross-sectional area of the damping opening be effective with respect to damping continuously or in finite steps or sectionally continuously or in finite steps, and in particular with respect to the damping openings related to a damping means based on the principle of hydraulic damping.

It is to be noted that the inventive configuration of the damping means as well as the inventive design of the damping behavior of the damping means refer in particular to such damping means in which fluids such as oil are moved between different chambers via connecting channel ports, damping openings respectively for the purpose of damping and, as necessary, solely for the purpose of damping.

In accordance with the invention, however, damping means may also be of a different configuration such as, for example, damping means based on a pneumatic principle or other configuration.

In the sense of the present invention, a damping means based on a pneumatic principle is particularly to be understood as one in which instead of a fluid like oil, gas is moved through connecting ports/channels or openings between chambers of a system of chambers in the manner as described.

In preferred configuration, there is unhindered fluid passage in a region or at least in one valve or the like disposed at one damping opening when the damping means, such as the spring damper system is subjected to pressure, while upon a tensile loading, the opening is kept substantially closed.

The damping means preferably comprises fluid-filled, especially liquid-filled chambers which are separated from one another by means of a damper piston. It is particularly preferred for the damper piston to be coupled with a piston rod which is connected to one of the load-applying segments of the spring damper system and indeed especially in a fixed manner so that there is no relative mobility.

It is preferential for the control element, which is preferably configured as a control rod, to be accommodated in the interior of the piston rod. It is particularly preferred for the control rod to be arranged with relative mobility with respect to the piston rod and so that it can induce different damping effects on the damping means from different axial positions.

In a particularly preferred configuration, the control element, such as the control rod, is arranged to be of relative mobility with respect to a housing of the spring damper system and, in fact, particularly of relative mobility with respect to all housing segments. It is particularly preferred to have two or more cylinders arranged to be axially displaceable relative one another included among the housing segments.

The interior of the piston road may be configured to be, for example, an axial passage channel which is, when seen from the axial direction, configured to be open at both sides.

An axial channel of this type may also be configured to be open at only one side and closed at the opposite side, or closed at both sides.

In preferred configuration, the piston rod is disposed with a casing wall encircling the piston rod interior. The interior can be, for example, arranged concentric to the casing wall.

In preferred configuration, the casing wall is provided with openings or damping openings configured as passage ports. In context hereto, it is especially provided that the damping openings connect the piston rod interior with the second chamber of the damping means.

It is moreover preferably provided for the piston rod interior to be connected with the first chamber of the damping means. Hereto, passage/damping openings may likewise be provided in the piston rod casing wall, or the connection between the first chamber of the damping means and the piston rod interior can be rendered via an opening provided in an end face of the piston rod.

It is particularly provided for the control rod to cover a different number of damping openings in differing axial positions. It is furthermore preferred for the control rod to cover different cross-sectional areas of the damping openings from differing axial positions.

As an example, without hereto constituting a restriction of the present invention, it is provided that a plurality of damping openings arranged to be axially offset with one another are configured as passage ports connecting the piston rod interior with the second chamber, whereby a connection between the piston rod interior and the first chamber of the damping means is rendered on the end face of the piston rod. In context hereto, it is preferred to provide that the control rod, contingent upon axial position, covers none or only some or all of the damping openings connection the second chamber with the piston rod interior.

It is furthermore preferred for the piston rod to have a tapered configuration at one end. In particularly preferred configuration, it is likewise the end section of the piston rod interior facing the first chamber, when seen in axial direction, which is of tapered configuration and open on the face side. This configuration may especially be such that the tapered end of the control rod can position in the tapering of the end region so as to substantially seal the same. Upon a displacing of the control rod in the axial direction, a cross-sectional area preferably enlarges in this configuration which defines the damping behavior of the damping means.

It is to be noted that the cited axially tapering sections of the damping openings, the control rod respectively, may have the same or differing sloping inclinations and exhibit a conical or non-conical surface.

The preferred configuration moreover provides for a positive spring as well as a negative spring.

The negative spring is especially a spring which has a counter effect to the positive spring and, in particular, such that the negative spring loads components arranged to be displaceable relative to one another in an effective direction that is opposite to the effective direction of the positive spring's loading of the components when the respective springs are subjected to stress and acting on the components.

In the case of two cylinders arranged axially displaceable relative to one another, it is especially preferred that the positive spring biases the cylinder toward a greater spatial distance, an extended position respectively, while the negative spring biases the cylinder toward less of a spatial distance, retracted position respectively.

As an example, the positive and negative spring may each be configured as gas springs.

In unloaded state of the spring damper system, the gas pressure of a gas spring configured in this manner is preferably set so as to be respectively greater than the ambient pressure.

It is to be noted that the spring mechanism may also comprise other spring elements such as, for instance, steel or elastomer springs, etc.

These other types of spring elements can be rendered in combination with gas springs or in the absence of gas springs.

In preferred configuration, the positive spring or the negative spring is configured as a gas spring and arranged such that one of the gas springs loads the plane of the control rod piston. This is especially provided such that the gas pressure of the positive or negative gas spring acts on a piston area of the control rod. The piston area of the control rod can in particular be provided on a piston disposed on the control rod or on an end face of the control rod.

It is to be noted that spring elements which are not gas springs may also act on the control rod piston plane.

There is furthermore another spring preferably acting on the control rod, the piston of the control rod respectively. It is especially preferential for the further spring to be a readjusting spring. In preferred configuration, the readjusting spring acts on the control rod such that same is biased toward a position in which the damping openings, their state of opening being subject to the effect of the control rod, are open. In a particularly preferred configuration, the force of the readjusting spring counters the force of the positive/ negative spring loading the control rod in order to (automatically) adjust the damping behavior of the damping means. The readjusting spring may be a gas spring or a metal or elastomer spring, or may also be a differently configured spring mechanism.

It is preferably provided that the spring damper system comprises a first cylinder as well as a second cylinder, wherein the first cylinder is arranged axially displaceable within the second cylinder. The inner diameter of the second cylinder is preferably larger than the outer diameter of the first cylinder and in fact such that a chamber is formed radially between the cylinders. The given differences in diameter are arranged such that a gas spring is or can be disposed between the outer surface of the first cylinder and the inner surface of the second cylinder.

It is especially preferred to arrange a negative chamber within the gap.

It is furthermore preferred that such a negative chamber is separated by means of a displaceably arranged piston from a positive chamber, same particularly preferred to have an effect on the control rod.

It is noted that, in the sense of the present invention, the term "negative chamber" refers especially to a negative spring which is preferably configured as a gas spring while the term "positive chamber" refers especially to a positive spring which is preferably configured as a gas spring. The positive spring/chamber and especially the negative spring/chamber may, however, also be spring mechanisms of different configuration.

It is preferable for the gas pressure in a negative chamber configured as a gas spring and/or in a positive chamber configured as a gas spring to be adjustable to different base values for the spring damper system in unloaded state.

For this purpose, the corresponding valve and/or filling means are provided as necessary.

It is additionally pointed out that other gas springs may also be provided which can likewise be filled by means of a valve system.

The positive spring and/or the negative spring may also be spring mechanisms which are not gas springs. As an example, the positive and/or negative spring may be configured as an elastomer spring.

It is particularly preferred to mount or employ the present inventive spring damper system for the respective defined purpose between a bicycle frame and a rear assembly coupled with same.

In accordance with the present invention, it is preferable for the damping behavior, the damping effect of the damping means respectively, to adjust automatically with respect to rebound damping.

It is furthermore preferred that the damping behavior, the damping effect of the damping means respectively, adjusts automatically with respect to compression damping, or in both rebound damping as well as also compression damping.

An additional damping means is provided in preferred configuration to act on the regulating mechanism. The additional damping means is in particular configured such that it induces a damping of the displacing movement upon shifting of the control element.

The present invention particularly provides for a procedure of suspension and damping for bicycle wheels whereby a gas spring unit comprises a gas-filled chamber and whereby the damping behavior of the damping unit is automatically set contingent upon the gas pressure given within the chamber. In particular, the chamber continuing gas may act as a positive spring or as a negative spring.

It is to be noted that the present invention is not to be limited by its preferred and exemplary embodiments and a great variety of other special configurations to the invention can be further realized.

The following will describe a number of preferred aspects of the present invention in greater detail based on reference to the drawings, which show:

DETAILED DESCRIPTION OF THE INVENTION

Figure 1:
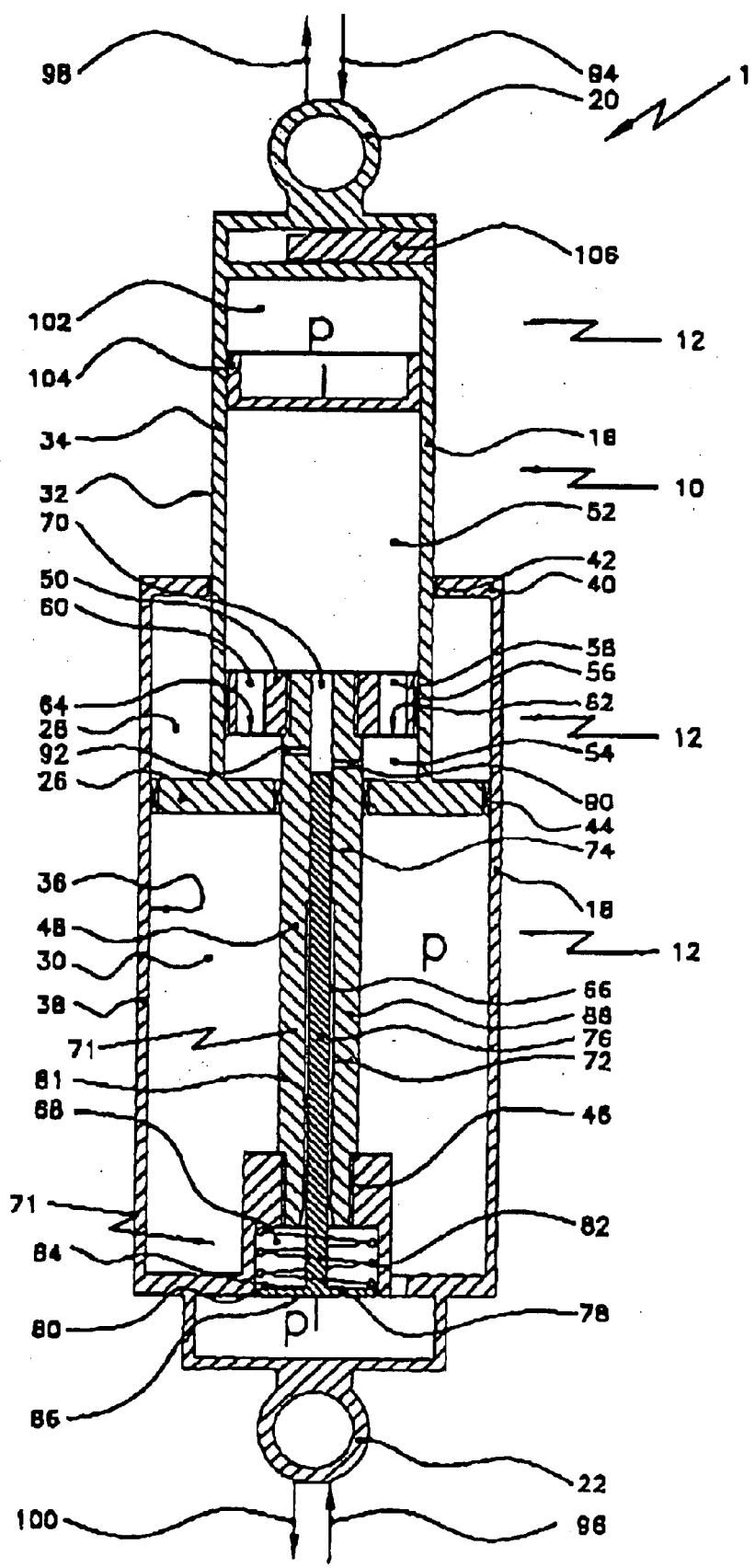
FIG. 1 a schematic representation of a first exemplary embodiment of the invention in a first loaded state of a control rod, positive spring respectively.

FIG. 1 shows an exemplary configuration of a spring damper system 1 in accordance with the present invention having a damping means 10 as well as a spring mechanism 12.

Spring damper system 1 further comprises a first cylinder 16 as well as a second cylinder 18. The first cylinder 16 is partly accommodated within the interior of the second cylinder 18. A partition 26 is arranged on the end of the first cylinder facing the second cylinder 18 which separates a negative chamber 28 disposed in the second cylinder 18 from a positive chamber 30 likewise disposed in the second cylinder 18. In FIGS. 1–7, a symbol "p" is used to indicate that a fluid pressure, such as a as pressure, is given within a particular chamber.

Said partition is especially a piston or separator piston.

Negative spring 28 is configured here as a gas spring. The gas spring comprises chamber 28 as well as the gas contained within.

In corresponding manner, positive spring 30 is configured as a gas spring and comprises a gas contained within chamber 30.

The negative spring extends between the outer surface 32 of hollow cylindrical wall 34 of first cylinder 16, the inner surface 36 of hollow cylindrical wall 38 of second cylinder 18, the partition 26, and the front substantially radially extending annular wall section 40 side of second cylinder 18.

Second cylinder 18 is sealed relative to first cylinder 16 by means of a suitable sealant 42 in the region of the radially inward situated end of the frontal wall section 40 side of second cylinder 18.

Partition 26 is sealed relative to the inner surface 36 of hollow cylindrical wall 38 by means of a suitable sealant 44. Partition 26 is solidly coupled to the first cylinder 16.

First load-applying segment 20 is configured in eyelet or grommet fashion and of substantially solid arrangement on the front end side of first cylinder 16 opposite second cylinder 18.

In corresponding manner, second load-applying segment 22 is of eyelet or grommet configuration and solidly arranged on the front end side of second cylinder 18 opposite first cylinder 16.

The second load-applying segment 22 arranged on second cylinder 18, second cylinder 18 respectively, is further coupled by means of suitable receiving means 46 with piston rod 48 which, in turn, is connected to damper piston 50.

Damper piston 50 is arranged between a first chamber 52 and a second chamber 54 of damping means 10.

Chambers 52, 54 are each filled with a damper fluid in the form of an oil.

Piston 50 is sealed relative to first cylinder 16 by means of a suitable sealant 56 and may be moved into the cylinder 16.

Damping or passage openings 58, 60 are provided in piston 50 which connect first chamber 52 with second chamber 54. Small spring plates 62, 64 are provided in the region of passage openings 58, 60 which allow the oil to flow through the damping openings 58, 60 from the first chamber 52 into the second chamber 54, yet which substantially prevent movement of fluid through the damping openings 58, 60 in the reverse direction.

Piston rod 48 comprises an axially and substantially concentrically extending passage opening 66.

One end of the passage opening 66 leads to first chamber 52 and the other end of the passage opening 66 leads to a further chamber 68 separate from the first and second chamber 54 in additional damping means 71.

The passage opening 66, respectively interior 70 of piston rod 48, comprises sections 72, 74 having different cross-sectional areas.

Section 72, having a larger cross-sectional area than section 74, faces chamber 68.

A control element configured as control rod 76 extends into passage opening 66, interior 70 of piston rod 48 respectively. A piston 78 is provided on the end of control rod 76 opposite first chamber 52. Control rod 76 is supported via the piston 78 relative second cylinder 18, whereby a suitable sealant 80 is provided between the second cylinder 18 and the piston 78. Control rod 76 is furthermore supported so as to be axially displaceable relative piston rod 48 at section 74, which has a smaller cross-sectional area compared to section 72.

Figure 7:
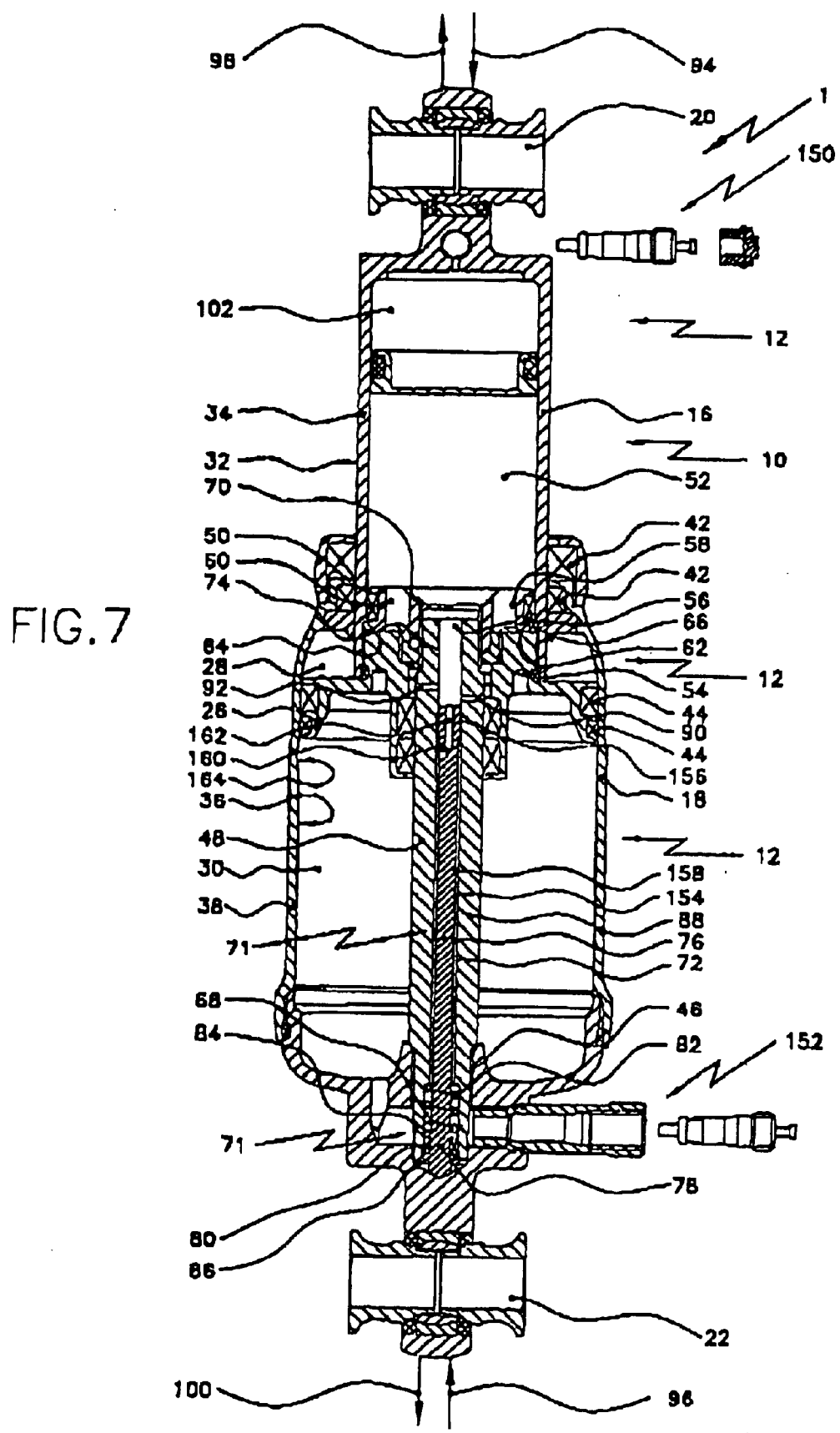
FIG. 7 a fourth exemplary embodiment of the invention in schematic representation.

Section 72 of passage opening 66, which has a larger cross-sectional area compared to section 74, extends substantially concentrically about the control rod 76 and forms a type of annular channel 81, through which the fluid contained in chamber 68 can flow toward first chamber 52 as well as second chamber 54. In this regard, what is not discernible from FIG. 1, but is shown by example in FIG. 7, is that there is an opening 160 provided in the control rod 76 which extends outwardly into the interior of the control rod at its end opposite the piston 78 and which is open to the first chamber 52.

A spring 82 is furthermore disposed in chamber 68 configured as, for example, a steel spring, and which biases piston 78, control rod 76 respectively, toward the end opposite first chamber 52.

Piston 78 is furthermore loaded, in the opposite direction, by the gas pressure of the gas disposed in positive chamber 30.

Upon increasing gas pressure in positive chamber 30, the control rod is increasingly biased in the direction of first chamber 52 against the force of spring 82 such that the control rod is increasingly moved toward first chamber 52.

Upon decreasing gas pressure in chamber 30, the control rod, subjected to the spring force of spring 82, moves in the opposite direction.

The respective axial position of control rod 76 is thus affected by the gas pressure of the gas disposed in chamber 30 as well as by the spring force of spring mechanism 82.

Spring 82 may have a constant or a variable spring constant through the displacement.

First piston area 84, facing first chamber 52, is in contact with the fluid found within chamber 68.

Second piston area 86 arranged on the side of piston 78 facing the first chamber 52 is in contact with the gas found within chamber 30.

Casing wall 88 of piston rod 48 exhibits substantially radially extending damping/passage openings 90, 92 which are arranged offset one another when seen from the axial direction of the control rod.

The respective opening cross-section of the damping openings 90, 92 is less than the opening cross-section of passage opening 66 on piston rod 48 disposed between openings 90, 92 and first chamber 52.

When the spring damper system 1 is subject to a pressure load, as indicated by arrows 94, 96, the gas pressure in chamber 30 increases. This increasing gas pressure has the effect of increasingly moving control rod 76 toward first chamber 52 until the point at which an axial equilibrium of forces on control rod 76 results. The equilibrium of forces may be in particular—at least in one or several axial positions of control rod 76—such that the force exerted on control rod 76 by the gas pressure is compensated by the force spring 82 exerts on the control rod in the opposite axial direction. Upon the corresponding (pre-) stressing of spring 102 to be described in the following, the equilibrium of forces can furthermore include the force of—in static state— the oil disposed in first chamber 52 acting on control rod 76 in the axial direction. This force is contingent upon the oil pressure which is—especially in the static state—in turn contingent upon the tension of spring 102. This force in particular acts counter to the force exerted on control rod 76 due to the gas pressure present in chamber 30. It is to be noted that frictional forces as well can enter into the equilibrium of forces acting upon control rod 76 in the axial direction.

In the position depicted in FIG. 1, control rod 76 is arranged such that both damping opening 90 as well as also damping opening 92 are open and thus not covered by control rod 76.

In this position, upon pressure-loading or further pressure-loading of the spring damper system, first cylinder 16 and second cylinder 18 are telescopically moved farther into one another. In so doing, damper piston 50 is moved by piston rod 48 such that first chamber 52 becomes substantially reduced in size and second chamber 54 becomes substantially enlarged in size. Upon this movement, fluid breaches second chamber 54 from first chamber 52.

This movement of fluid is induced such that oil is moved through passage openings 58, 60 whereby, subject to the pressure of the fluid, the small spring plates 62, 64 open damping openings 58, 60 and enable the overflow of oil from first chamber 52 into second chamber 54. The oil moreover flows from first chamber 52 through the interior 70 of piston rod 48 as well as damping openings 90 and 92 into second chamber 54.

Upon rising gas pressure in chamber 30, control rod 76 moves increasingly toward first chamber 52 so that damping opening 90 is initially closed and, in this position, oil from first chamber 52 can only overflow into second chamber 54 through damping openings 58, 60 as well as damping opening 92.

Upon relieving of spring damper system 1, upon the rebound damping of spring damper system 1 respectively, the spring damper system slackens, as schematically indicated by arrows 98, 100.

In so doing, the volume in chamber 30, which had been decreased due to the pressure load, now increases so that the gas pressure in chamber 30 drops.

Upon this decreasing gas pressure, control rod 76 is relieved such that, especially due to the effect of spring 82, it moves in the direction opposite first chamber 52 and thus damping openings 90, 92 are cleared again at the corresponding positions, at least partly.

Upon this movement directed toward the relieving of the spring damper system 1 (rebound damping), oil flows from second chamber 54 into first chamber 52. A flow through damping openings 58, 60 is hereby prevented by small spring plates 62, 64. The oil hence flows through damping opening 92 and, as soon as damping opening 90 becomes clear, also through same as well.

Spring damper system 1, further comprises a spring 102 separated from the first oil-filled chamber 52 by full floating piston 104 which, as need be, is sealed relative to first cylinder 16. Spring 102 in the configuration according to FIG. 1 is configured as a gas spring and thus comprises a chamber that is filled with gas. The volume, respectively pressure of the gas of spring 102 configured as a gas spring may be adjusted by means of the appropriate valve or filling means 106.

A valve or filling mechanism of this type is, as necessary, also provided for filling or generating a base pressure in positive chamber 30. Although not depicted in FIG. 1, such a valve means may also be provided for filling negative chamber 28.

It is however to be noted that especially negative chamber 28 can also be provided as a differently configured spring mechanism such as, for example, an elastomer spring mechanism. With this type of configuration, sealant 42, for example, can be omitted.

Although not shown in FIG. 1, an overflow can also be provided on inner surface 36 of hollow cylindrical wall 38 of second cylinder 18, which is configured, for instance, as a groove-like channel.

An overflow of this type enables, especially in certain relative positions of the first 16 and the second cylinder 18, gas to overflow between positive chamber 30 and negative chamber 28 such that a corresponding equalization of pressure is generated in at least one predefined position when positive chamber 30 and negative chamber 28 are configured as gas-filled chambers.

Figure 2:
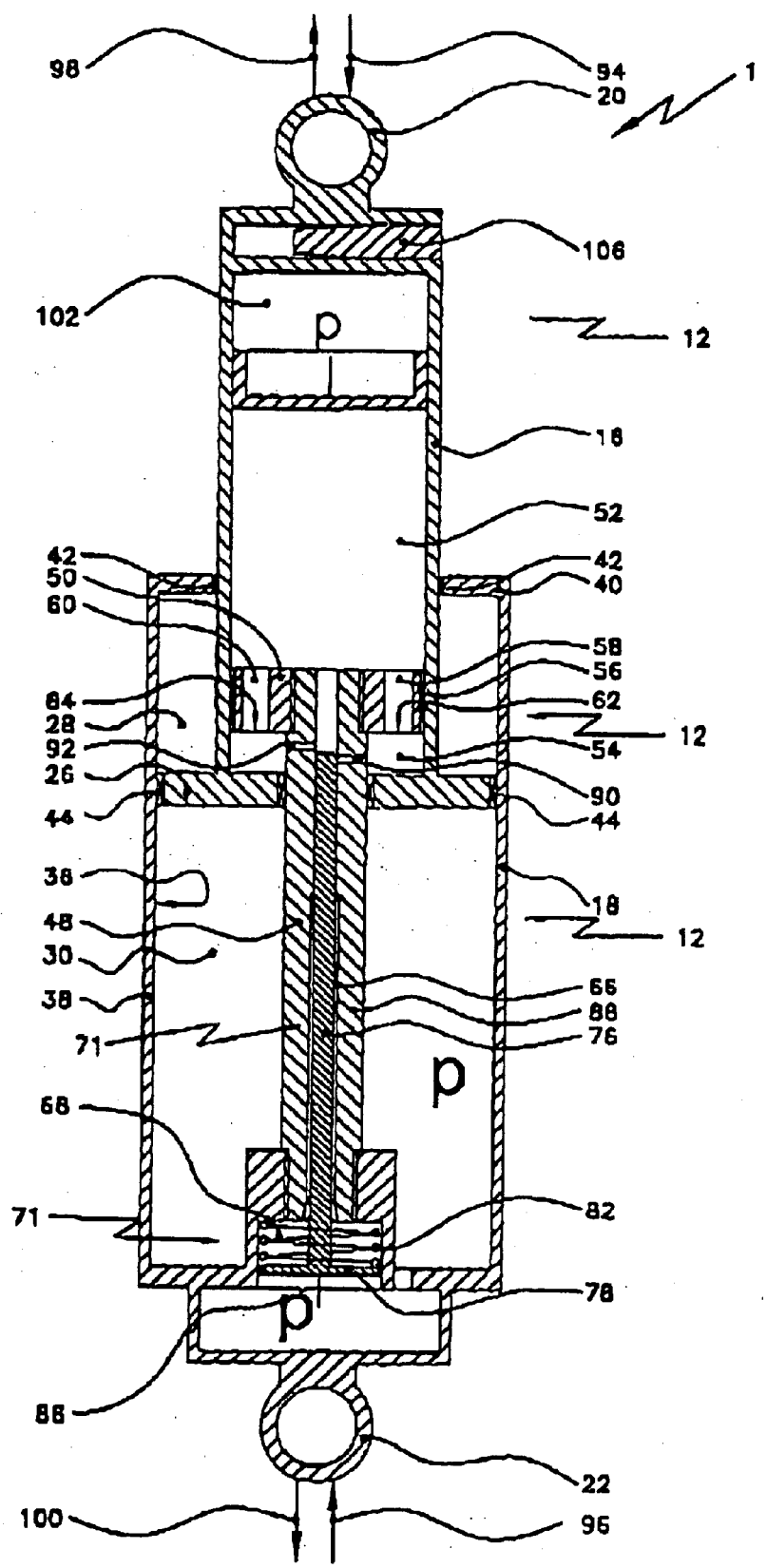
FIG. 2 the exemplary embodiment according to FIG. 1 in a second loaded state of a control rod, positive spring respectively.

FIG. 2 depicts a second position of the spring damper system 1 according to FIG. 1.

In this position, as can be seen from FIG. 2, control rod 76 is moved farther toward the first chamber 52 compared to the representation given in FIG. 1. This movement induces spring 82, subject to the effect of a higher gas pressure in chamber 30, to be increasingly compressed. In addition, the control rod is shifted such a distance toward first chamber 52 that damping opening 90 is substantially covered. In the representation according to FIG. 2, an exchange of oil between first chamber 52 and second chamber 54 is rendered possible through damping opening 92.

Figure 3:
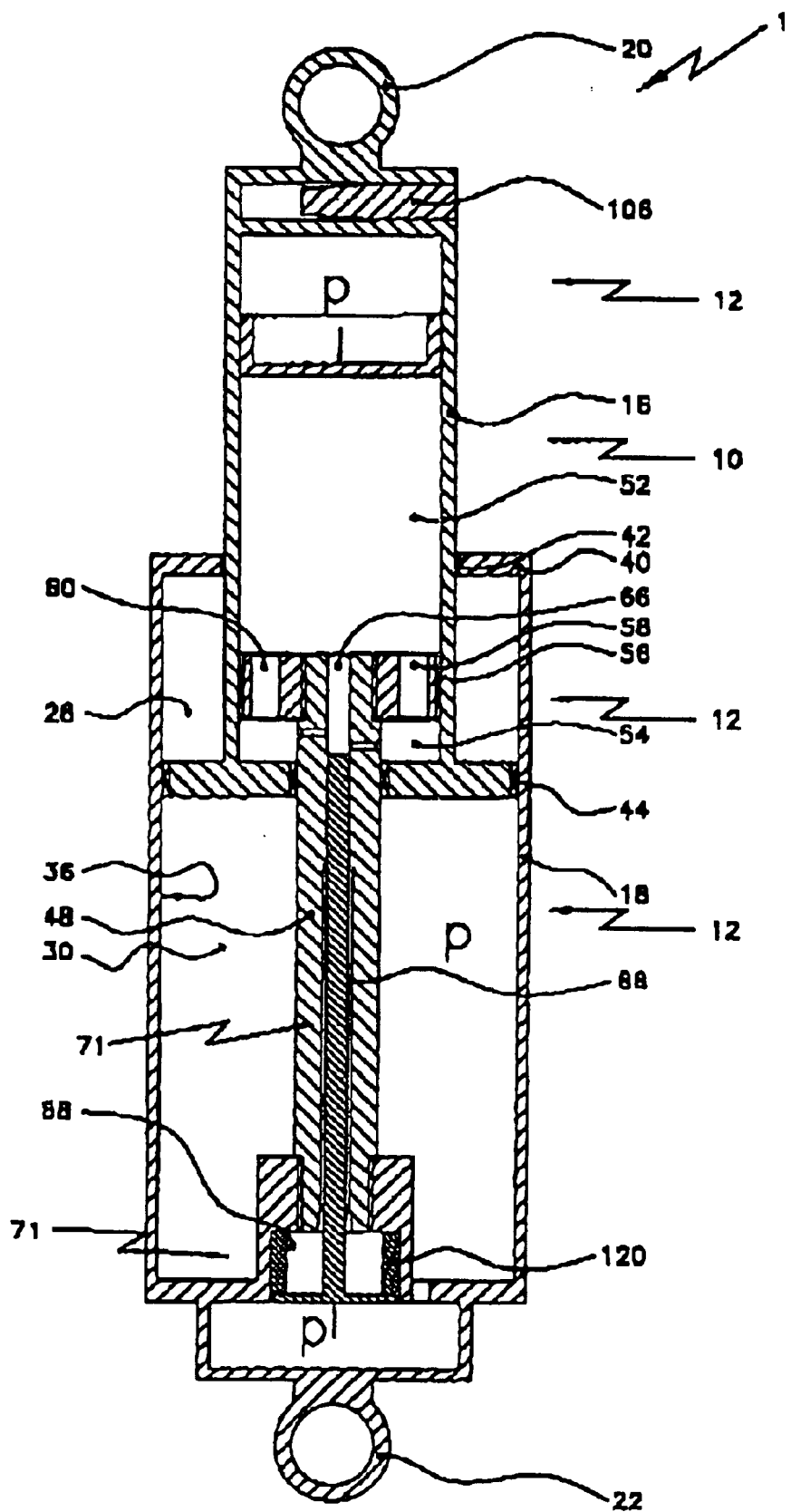
FIG. 3 a schematic representation of a second exemplary embodiment of the invention in a first loaded state of a control rod, positive spring respectively.

FIG. 3 depicts a schematic representation of a further exemplary embodiment of the present invention.

The configuration according to FIG. 3 differs from the configuration according to FIG. 1 especially with respect to the spring arranged in chamber 68. While a steel or helical spring is selected in the representation according to FIG. 1, an elastomer spring element 120 is provided in chamber 68 in the representation in accordance with FIG. 3.

Figure 4:
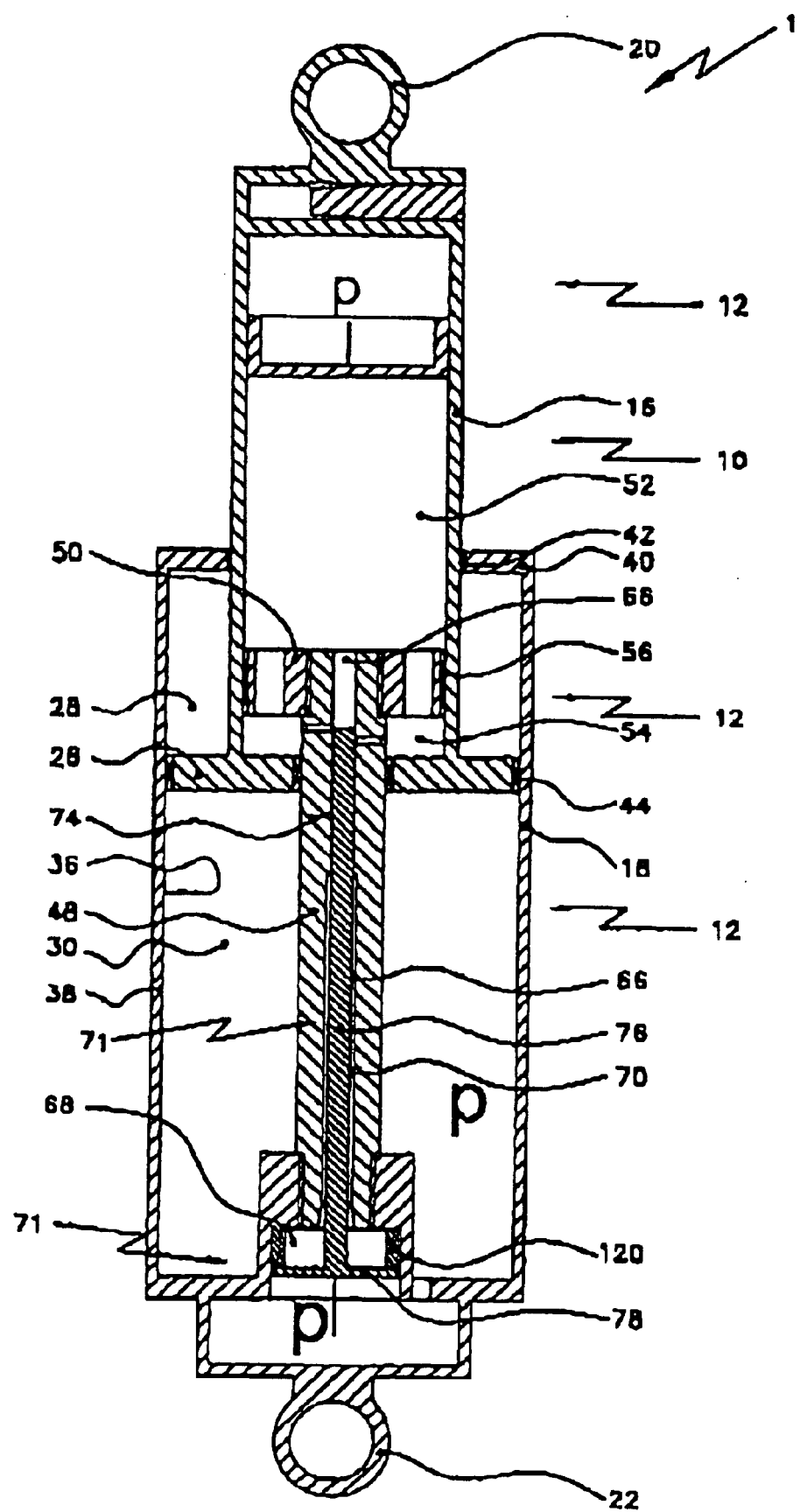
FIG. 4 the configuration according to FIG. 3 in a second loaded state of a control rod, positive spring respectively.

FIG. 4 shows the spring damper system 1 according to FIG. 3 in a position which corresponds substantially to the position according to FIG. 2.

As can be seen from FIG. 4, elastomer spring element 120 in this position of control rod 76 is compressed when compared to the representation according to FIG. 3.

Figure 5:
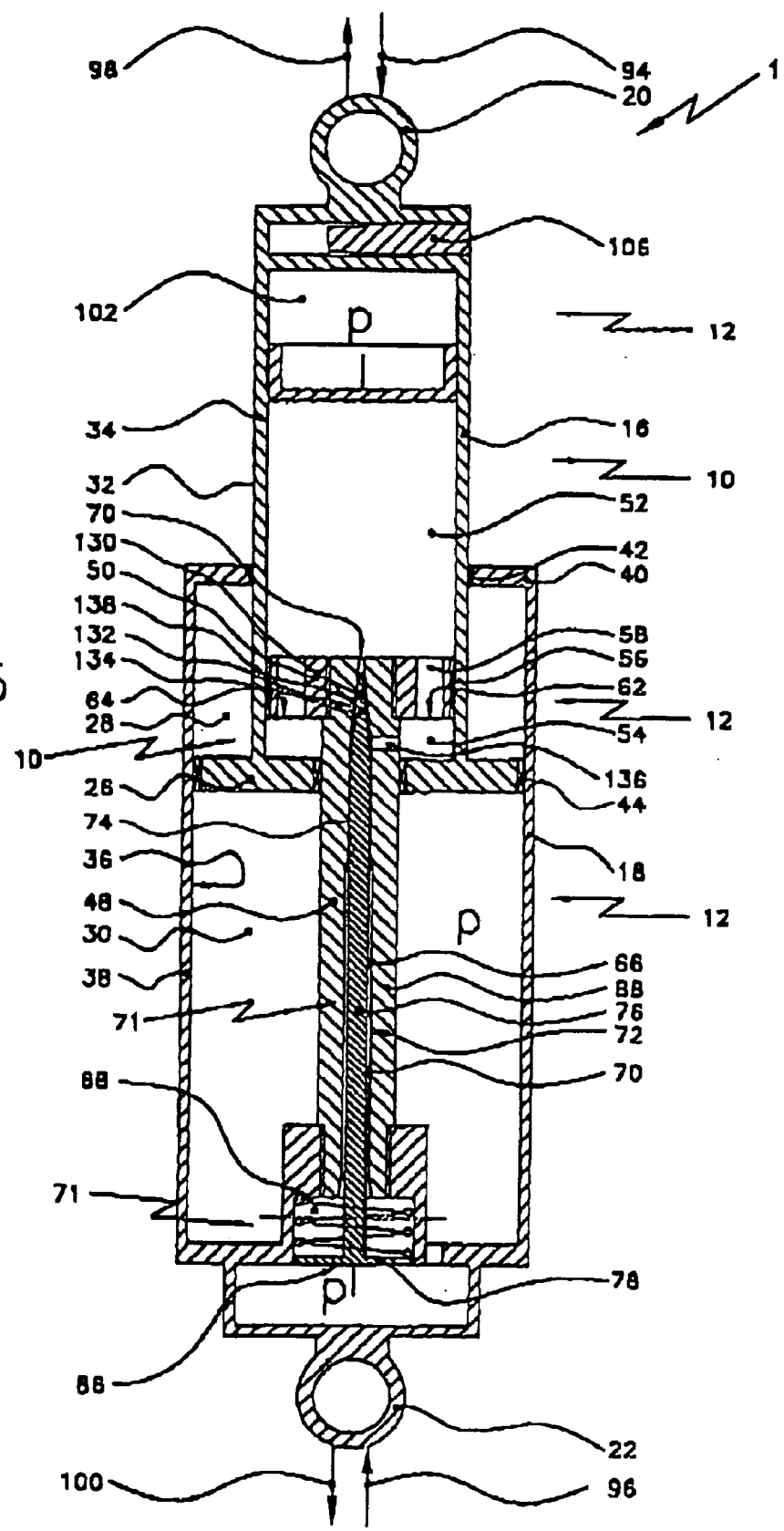
FIG. 5 a schematic representation of a third exemplary embodiment of the invention in a first loaded state of a control rod, positive spring respectively.

FIG. 5 depicts another configuration of the inventive spring damper system 1 which differs from the configuration according to FIG. 1 especially by the configuration of passage opening 66 in the area adjoining first chamber 52 as well as by the configuration of the end section facing control rod 76 in first chamber 52.

In the configuration of the spring damper system 1 according to FIG. 5, the end section of passage opening 66 facing first chamber 52 tapers toward the first chamber 52.

A corresponding tapering is also provided on end section 130 of control rod 76 facing the first chamber 52. This tapered section 132 of control rod 76 is surrounded by a port section 134 in the position of the control rod 76 according to FIG. 5 which is arranged between piston rod 48 and tapered section 132 of control rod 76. The port section 134 as well as the passage opening 136 allow for a fluid connection between the first chamber 52 and the second chamber 54. The port section 134 hereby acts as a damping opening.

With increasing axial displacement of control rod 76 toward load-applying segment 22, the cross-sectional area of port section 134 enlarges so that the damping effect is reduced.

Figure 6:
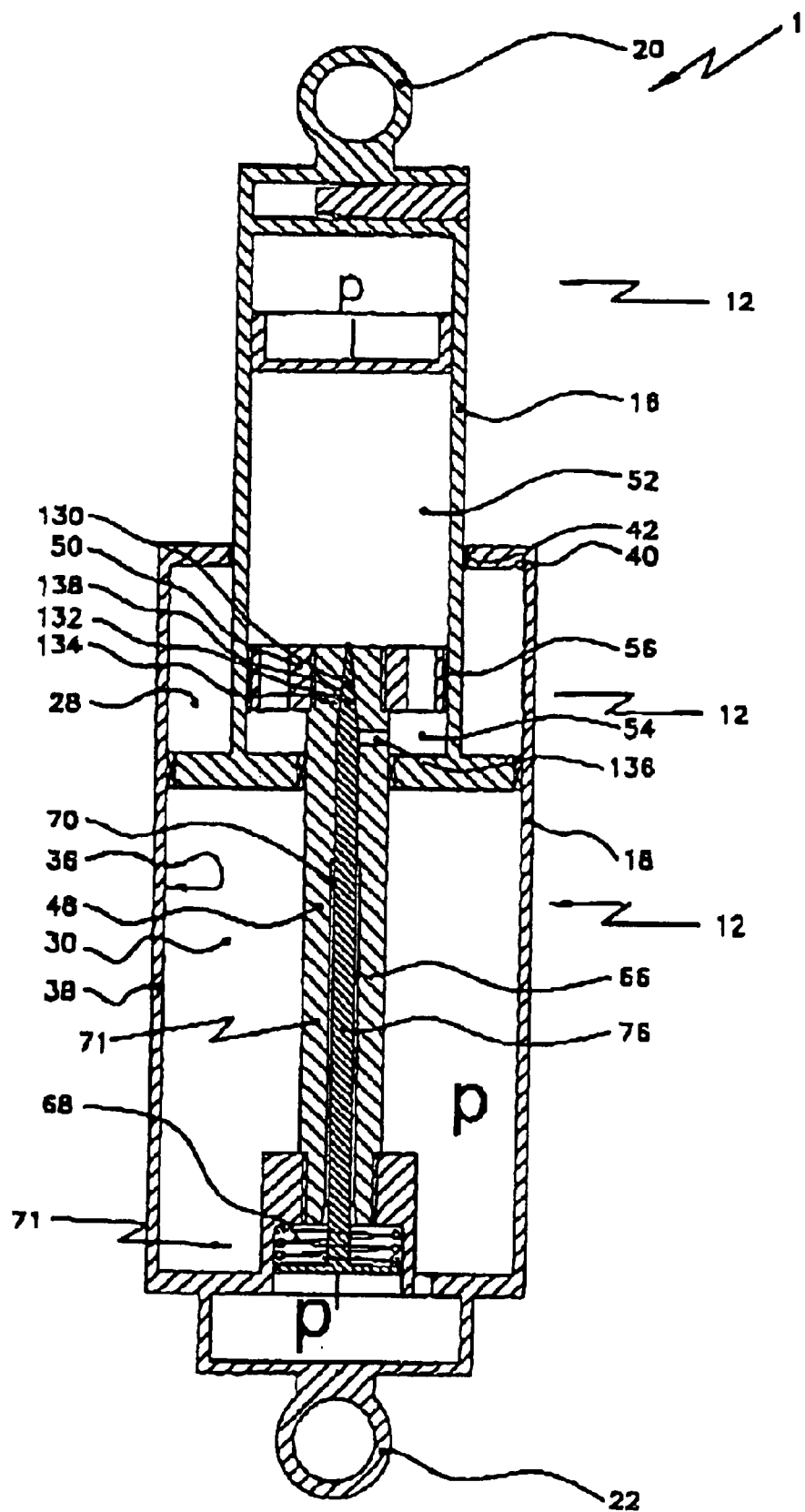
FIG. 6 the configuration according to FIG. 5 in a second loaded state of a control rod, positive spring respectively.

FIG. 6 shows the configuration of spring damper system 1 according to FIG. 5, in which control rod 76 is shifted further toward first chamber 52 and tapered section 132 of the control rod 76 abuts against tapered section 138 of the piston rod 48, piston 50 respectively. In this position, port section 134 is substantially closed, thus preventing an exchange of oil between first chamber 52 and second chamber 54 through the port section.

FIG. 7 shows an exemplary embodiment of the present invention which comprises a plurality of features from the configuration represented in FIG. 1.

A number of other or distinct features are depicted in FIG. 7 which will be addressed to some extent in the following.

In the configuration according to FIG. 7, in addition to filling means 150 for filling chamber 102 with gas, a filling means 152 is also provided for filling second chamber 30 with gas.

Additionally in the configuration according to FIG. 7—unlike in the FIG. 1 configuration—there is no provision for a section 72 having larger cross-sectional area nor a section 74 having smaller cross-sectional area of passage opening 66, but rather a passage opening 66 is provided which has the sections 72, 74 as represented in FIG. 1 being substantially constant in their cross-sectional area.

Although differing from the configuration according to FIG. 1, the configuration according to FIG. 7 has in fact provided control rod 76 with different cross-sectional areas. Control rod 76 has an area 154 comprising a smaller cross-sectional area, a smaller circumference respectively, as well as an area 156 arranged toward first chamber 52—as seen from the area 154—which has a—comparatively—larger cross-sectional area, a larger circumference respectively. Control rod 76 is directed axially in the area 156 relative piston rod 48.

It is to be noted in conjunction hereto that what is particularly meant as the cross-sectional area with respect to control rod 76 is the area spanned by the outer circumferential contour.

It is further noted that annular channel 158 can also be formed by, for example, a combination of comparable configurations corresponding to FIGS. 1 and 7 such that—particularly in the forming of the annular channel 158—both a section of opening 66 having larger cross-sectional area as well as a section of control rod 76 having smaller cross-sectional area is provided.

With respect to the configurations having different cross-sectional areas, it must be noted that the different cross-sectional areas are in particular disposed at positions outside of chamber 68, respectively outlying piston 78 of control rod 76 arranged as need be within chamber 68.

The configuration according to FIG. 7 also provides for chamber 68 being connected to first chamber 52, and as required to second chamber 54, by means of annular channel 158 in which opening 160 extends substantially radially in the interior of the control rod as well as port 162 extending from the opening 160 to the end of control rod 76 facing the first chamber 52. This connection enables a damping effect to be generated upon the corresponding exchange of damper fluid, oil respectively, and in particular hereto, an additional damping effect which dampens the movement of the control rod upon axial displacement.

It is to be noted that instead of or in addition to annular channel 158, a connecting channel may also be provided in control rod 76 to connect chamber 68 with port 162; there may feasibly not be an opening 160 provided in such a configuration—especially when there is no additional annular channel 158 provided.

Opening 160 as described on the basis of FIG. 7 is also provided in the configurations according to FIGS. 1–4, as is port 162 also described on the basis of FIG. 7.

This type of opening 160 as well as type of channel port 162 may also be provided for in the configuration described on the basis of FIGS. 5 and 6. In the configuration according to FIGS. 5 and 6, channel port 162 may be open in the region of the conical or tapered outer surface, instead of on the front end side of control rod 76. This can be rendered technically, for example, by the employment of a multi-sectional control rod 76 or by sealing the facing end side of the frontal open area in connection with a further substantially radial opening.

An overflow 164 is furthermore provided in the configuration according to FIG. 7 which enables a pressure equalizing, respectively an overflow of gas relative the positive and the negative chamber in a pre-defined position or position range. Such an overflow 164 may also be provided in the configurations according to FIGS. 1–6.

It is to be particularly noted with respect to FIGS. 1–-7 that additional damping means 71 dampen the movement of control rod 76. This damping is induced particularly in that the damper fluid, meaning especially oil in the configurations according to FIG. 1–7, is moved between chamber 68 and a further chamber through the corresponding taperings, channel ports or openings respectively, the further chamber being particularly the first and/or second chamber. Ports or openings are especially annular channel 158, respectively a correspondingly disposed port in the interior of the control rod and/or the opening and/or the port 162. Instead of a liquid or the oil, a gas may also be employed as the damper fluid.

What is claim is:

1. A spring damper system for bicycles having:
   a first load-applying segment and a second load-applying segment;
   at least one spring mechanism comprising at least one spring arranged to be operatively effective between said first and the second load-applying segments;
   a damping means arranged to be operatively effective between the first and said second load-applying segments;
   a regulating mechanism by means of which the damping behavior of said damping means can be adjusted;
   whereby said regulating mechanism automatically effects a damping behavior setting of said damping means contingent upon a tension or load present in said at least one spring;
   whereby the regulating mechanism comprises at least one control element configured as a control rod and arranged to be moveable relative to at least one passage opening by means of which an opening cross-section of said at least one passage opening can automatically be modified for adjusting the damping behavior setting;
   whereby said at least one spring includes at least one chamber filled only with gas, whereby said at least one chamber filled only with gas acts as a gas spring in concert with the gas present therewithin;
   whereby said control rod comprises a control rod piston area which is loaded by said gas spring such that the spring force of said gas spring upon loading induces an axial displacement of the control rod; and
   whereby at least one control rod spring acts on said control rod, a spring force of said at least one control rod spring acting counter to the spring force of said gas spring.

2. The spring damper system in accordance with claim 1, wherein the gas spring is configured so that the damping behavior setting of said damping means is particularly effected automatically contingent upon the tension or load present in said gas spring.

3. The spring damper system according to claim 2, wherein a piston rod has an interior which is further connected to a first damping chamber, wherein said piston rod further has a casing wall extending around said interior of said piston rod and wherein said at least one passage opening comprises at least two openings that are axially offset and which connect said interior of said piston rod with a second damping chamber.

4. The spring damper system according to claim 1, wherein said damping means comprises a system of damper chambers filled with a damper fluid, said system of damper chambers having a first and at least one second damper chamber with the damper fluid being moved for a purpose of damping between said system of damper chambers through said at least one passage opening connecting said system of damper chambers.

5. The spring damper system according to claim 3, wherein said at least one chamber filled only with gas includes a first chamber filled only with gas and a second chamber which further is filled only with gas, whereby said second chamber which is filled only with gas acts as a supplemental gas spring in concert with the gas present therewithin.

6. The spring damper system according to claim 5, wherein a positive spring and a negative spring are provided, wherein said positive spring comprises one of said first and second chambers filled only with gas and said negative spring comprises the other of said first and second chambers filled only with gas.

7. The spring damper system according to claim 1, wherein said at least one control element is arranged to be moveable relative to said at least one passage opening for said at least one control element to adjust the damping behavior setting of said damping means in finite steps of successive closing, and thereby automatically contingent upon the tension or load present in said at least one gas spring.

8. The spring damper system according to claim 1, wherein a damper piston is arranged to be displaceable between a first and a second damper chamber.

9. The spring damper system according to claim 1, wherein a piston rod is provided connected to a damper piston for loading said damper piston and which is coupled with said second load-applying segment so that a loading of said second load-applying segment induces a loading of said damper piston.

10. The spring damper system according to claim 1, wherein a piston rod accommodates said control rod which is axially displaceably configured, in an interior of said piston rod and which induces a different damping behavior setting in said damping means at different axial positions.

11. The spring damper system according to claim 10, wherein said control rod is tapered at one end and wherein at least one of an interior of said piston rod and a damper piston is connected with a said chamber filled only with gas by means of a tapered opening.

12. The spring damper system according to claim 1, wherein said spring damper system comprises a first cylinder and a second cylinder, whereby said first cylinder projects axially displaceably into said second cylinder.

13. The spring damper system according to claim 12, wherein a partition is arranged in a region of an end of said first cylinder facing said second cylinder which separates said first one of said at least one chamber filled only with gas, which is a negative chamber arranged radially external of said first cylinder from a second one of said at least one chamber filled only with gas, which is a positive chamber axially adjoining said negative chamber.

14. The spring damper system according to claim 13, wherein said positive chamber extends radially external of a piston rod and comprises a region situated at a face end of said control rod opposite said first cylinder which extends to said control rod so that said control rod is loaded in an axial direction by said gas provided in said positive chamber.

15. The spring damper system according to claim 1, wherein said control rod comprises an enlarged cross-sectional area via which said control rod is loaded by said gas spring in an adjusting of the damping behavior of said damping means in an axial direction.

16. A spring damper system for bicycles having:
   a first load-applying segment and a second load-applying segment;
   at least one spring mechanism comprising at least one spring arranged to be operatively effective between said first and said second load-applying segment;
   a damping means arranged to be operatively effective between said first and said second load-applying segment;
   a regulating mechanism by means of which the damping behavior of said damping means can be adjusted;
   whereby said regulating mechanism automatically effects a damping behavior setting of said damping means contingent upon a tension or load present in said at least one spring;
   whereby said regulating mechanism comprises at least one control element configured as a control rod and arranged to be moveable relative to at least one passage opening by means of which an opening cross-section of said at least one passage opening can be automatically modified for adjusting the damping behavior setting;
   whereby said at least one spring includes at least one chamber filled only with gas, whereby said at least one chamber filled only with gas acts as a gas spring in concert with the gas present therewithin;
   whereby said control rod comprises a control rod piston area which is loaded by said gas spring such that the spring force of said gas spring upon loading induces an axial displacement of said control rod;
   whereby at least one control rod spring acts on said control rod, a spring force of said at least one control rod spring acting counter to the spring force of said gas spring; and
   wherein said at least one control element is arranged to be moveable relative to said at least one passage opening for said at least one control element to adjust the damping behavior setting of said damping means in finite steps of successive closing, and thereby automatically contingent upon the tension or load present in said gas spring.

* * * * *